US012623543B2

(12) United States Patent
Schmalbruch

(10) Patent No.: US 12,623,543 B2
(45) Date of Patent: May 12, 2026

(54) INFORMATION SYSTEM FOR A MOTOR VEHICLE, METHOD FOR THE SITUATIONAL SUPPRESSION OF AN OUTPUT OF INFORMATION AND MOTOR VEHICLE

(71) Applicant: VOLKSWAGEN AKTIENGESELLSCHAFT, Wolfsburg (DE)

(72) Inventor: Michael Schmalbruch, Wolfenbüttel (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 246 days.

(21) Appl. No.: 18/734,633

(22) Filed: Jun. 5, 2024

(65) Prior Publication Data

US 2024/0399872 A1 Dec. 5, 2024

(30) Foreign Application Priority Data

Jun. 5, 2023 (DE) ..................... 10 2023 205 232.6

(51) Int. Cl.
*B60K 35/80* (2024.01)
*B60K 35/29* (2024.01)

(52) U.S. Cl.
CPC .............. *B60K 35/80* (2024.01); *B60K 35/29* (2024.01); *B60K 2360/1868* (2024.01); *B60K 2360/195* (2024.01)

(58) Field of Classification Search
CPC .................... B60K 35/80; B60K 35/29; B60K 2360/1868; B60K 2360/195;
(Continued)

(56) References Cited

U.S. PATENT DOCUMENTS

2001/0020202 A1* 9/2001 Obradovich ........... B60K 35/10 701/487
2007/0225882 A1* 9/2007 Yamaguchi ........... B60W 50/14 701/45
(Continued)

FOREIGN PATENT DOCUMENTS

DE 102010002105 A1 8/2011
DE 102017005833 A1 12/2018
(Continued)

OTHER PUBLICATIONS

SAE J3016; International; Taxonomy and Definitions for Terms Related to Driving Automation Systems for On-Road Motor Vehicles; Sae J3016 Wikipedia; Mar. 23, 2023; URL: https://de.wikipedia.org/w/index.php?title=SAE_J3016&oldid=232103834; downloaded from https://en.wikipedia.org/wiki/Self-driving_car#SAE_classification; downloaded on Jun. 4, 2024.

*Primary Examiner* — Richard M Camby
(74) *Attorney, Agent, or Firm* — BARNES & THORNBURG LLP

(57) ABSTRACT

An information system for a transportation vehicle configured to output, during a journey, information to a user of the transportation vehicle about an existing or impending engagement of the transportation vehicle in a driving parameter, wherein the output of the information to the user is suppressed, wherein a value of a control parameter predefined by the user is considered in a decision to determine whether the output of the information to the user is suppressed. A method for the situational suppression of an output of information about an existing or impending engagement of a transportation vehicle in a driving parameter for driving the transportation vehicle.

17 Claims, 4 Drawing Sheets

(58) Field of Classification Search
CPC .. B60K 2360/172; B60K 35/10; B60K 35/22; B60K 35/21; B60K 35/25; B60K 35/26; B60K 35/28; B60K 35/85; B60K 2360/16; B60Q 9/00; B60W 50/14; B60W 50/16; B60W 2050/146
See application file for complete search history.

(56) References Cited

U.S. PATENT DOCUMENTS

| | | | | |
|---|---|---|---|---|
| 2013/0124041 | A1 | 5/2013 | Belser et al. | |
| 2016/0039412 | A1* | 2/2016 | Stählin | B60T 8/17 701/41 |
| 2018/0334165 | A1* | 11/2018 | Schneider | B60W 50/0098 |
| 2019/0049262 | A1* | 2/2019 | Grimm | G01C 21/3492 |
| 2020/0094872 | A1* | 3/2020 | Seeland | B62D 15/027 |
| 2020/0168204 | A1* | 5/2020 | Iijima | G10L 13/033 |

FOREIGN PATENT DOCUMENTS

| | | | |
|---|---|---|---|
| DE | 102019004265 | A1 | 5/2020 |
| KR | 20220060002 | A | 5/2022 |

* cited by examiner

INFORMATION SYSTEM FOR A MOTOR VEHICLE, METHOD FOR THE SITUATIONAL SUPPRESSION OF AN OUTPUT OF INFORMATION AND MOTOR VEHICLE

PRIORITY CLAIM

This patent application claims priority to German Patent Application No. 10 2023 205 232.6, filed 5 Jun. 2023, the disclosure of which is incorporated herein by reference in its entirety.

SUMMARY

Illustrative embodiments relate to an information system for a transportation vehicle, which is designed to output, during a journey, information to a user of the transportation vehicle about an existing or impending engagement of the transportation vehicle in a driving parameter, to a method for the situational suppression of an output of information about an existing or impending engagement of a transportation vehicle in a driving parameter for driving the transportation vehicle and to a transportation vehicle.

BRIEF DESCRIPTION OF THE DRAWINGS

Exemplary embodiments are described below with reference to the drawings, in which.

DETAILED DESCRIPTION

Figure 1:
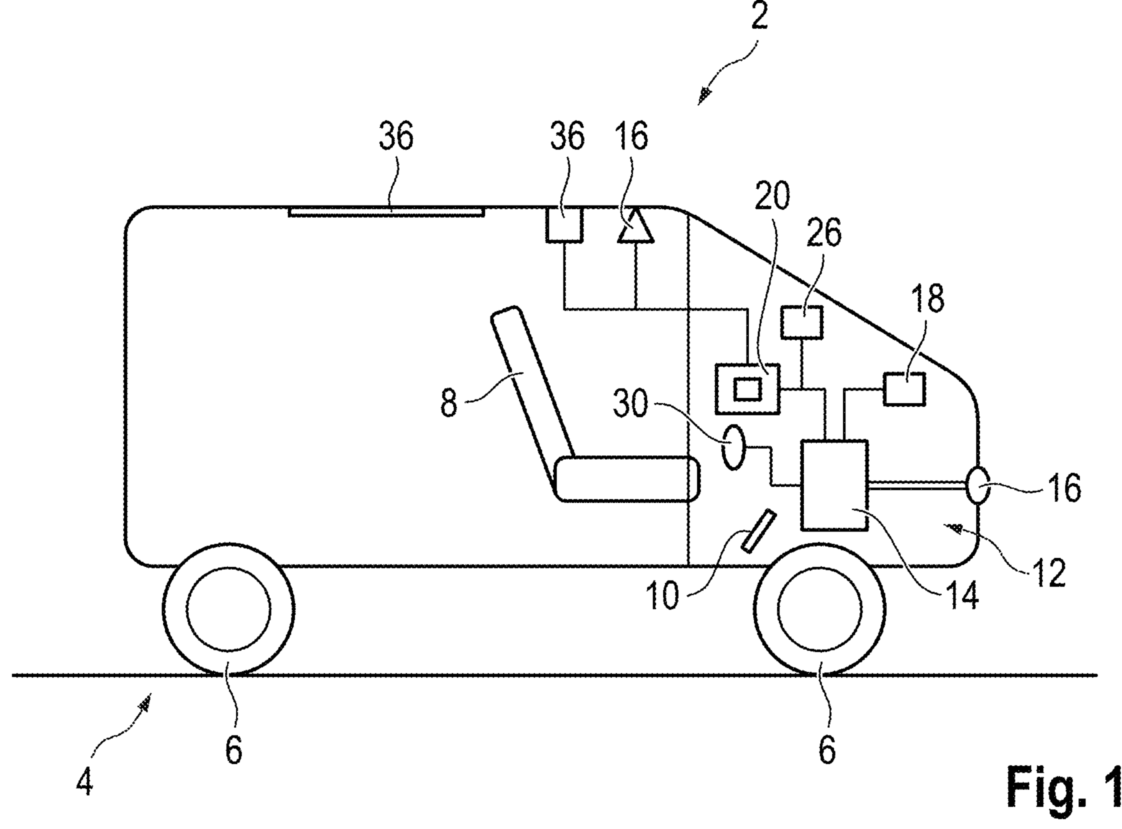
FIG. 1 schematically shows a schematic side view of a transportation vehicle with a first exemplary embodiment of an information system.

For a long time in transportation vehicles there was a mechanical coupling between wheel brakes and an actuation device for the wheel brakes, i.e., generally the brake pedal, as standard. In the course of development toward electromobility and also toward partially autonomous or fully autonomous driving, more and more "decoupled" brake control systems are being used. This means that there is no longer a mechanical coupling between the brake pedal and the usually hydraulic brake system, such as a main brake cylinder and/or a brake caliper. The actuation of the wheel brakes subsequently takes place by way of a separate actuator. This actuator is subsequently connected to the actual brake system only via interposed sensors or electronics. Such a system is also referred to as a "Brake-by-Wire" system. As a result of the decoupling mentioned, the driver does not receive any haptic feedback from the system upon braking and, for example, their foot no longer feels it when a stabilizing wheel pressure control is implemented, such as ABS control, for example, which causes a slightly vibrating brake pedal in conventional systems.

As a result of the decoupling, in particular, in the case of an electrical connection of the brake pedal, the brake control system components can be installed freely in the engine compartment, which in turn brings about an improvement in the acoustic decoupling. As a result, the driver can no longer perceive a possible brake control procedure, possibly alternatively audibly. The same is true when using electromechanical brake calipers instead of hydraulic brake calipers. In many cases, therefore, the driver will neither hear nor feel when they reach the locking pressure or trigger ABS control upon actuating the brake.

Such an avoidance of sensory feedback may be desirable. For example, for reasons of comfort, such as in the case of autonomous or partially autonomous driving, for example, it can be perceived as pleasant when as many sensory influences as possible are kept from the driver. In other cases, however, information about the slip conditions at the wheel, for example, in sport driving or similarly when using the transportation vehicle on a racetrack, can be helpful or even necessary to optimize the braking point before a bend, for example. One possible measure for informing the driver of a brake control engagement is haptic, audible or visual indications. According to the prior art, these indications are output upon each brake control system engagement. In many areas, this can be perceived as distracting. In certain circumstances, a distraction by such an information system felt by the user can result in the user deactivating the associated assistance system. In particular, in the case of safety-relevant assistance systems, it is therefore highly desirable to avoid such a distraction felt by the user. The same applies to notifications about the use of other assistance systems. Such assistance systems can be a lane departure warning assistant, a speed assistant, an anti-slip control system or other assistance systems, for example.

The disclosed embodiments provide a way of avoiding the driver being distracted as a result of excessively frequent information about an existing or impending engagement of the transportation vehicle in a driving parameter, but at the same time providing the driver with a sufficient amount of such information.

This is achieved by an information system for a transportation vehicle of the type mentioned in the introduction, in which the output of the information to the user can be suppressed, wherein a value of a control parameter predefined by the user is taken into account in a decision as to whether the output of the information to the user is suppressed.

An engagement in a driving parameter can be understood here to mean, in particular, an engagement in steering of the transportation vehicle or an engagement that has an effect on the speed of the transportation vehicle. In other words, such an engagement can consist of an engagement in the longitudinal or transverse guidance of the transportation vehicle. The engagement in a driving parameter can therefore be, for example, a steering engagement, an acceleration or braking of the transportation vehicle, the activation of an anti-lock braking system or generally a brake control system engagement, the activation of an electronic stability program or the activation of anti-slip control.

Information to a user of the transportation vehicle can be understood, in particular, to mean visual, audible or haptic information. It is possible, for example, to depict visual information on a display or as illumination of a light in the dashboard. A change in the ambient lighting, for example, bright illumination of the ambient lighting, can also be used as a visual signal. Audible information can be speech information or a sound that is output by the transportation vehicle. For example, a sound can be output by a combination warning sound, fading a signal in via one or more radio speakers or sounds from a "Park Distance Control" system, in other words thus an audible parking aid. Haptic information can include, for example, a vibration of a steering wheel of the transportation vehicle, a vibration of a pedal of the transportation vehicle, for example, the brake pedal of the transportation vehicle, or the activation of a massage seat. All other known and customary Force-Feedback mechanisms are likewise also possible.

According to the disclosed embodiments, the idea of linking the output or suppression of haptic, audible or visual feedback, about the slip conditions at the wheels of the transportation vehicle, for example, to an adjustment option accessible to the user is implemented. For example, the output or suppression of the feedback can be linked to a driving program selected by the user or linked situationally to the driving state.

If the information to be output is information about the slip conditions at one wheel of the transportation vehicle or at a plurality of wheels of the transportation vehicle, the criterion of an existing or impending engagement in a driving parameter can be fulfilled if, for example, the locking pressure is close to being reached or the locking pressure has been reached. The same applies to the use of an anti-lock braking system (ABS system). The output of information can essentially be provided if the triggering of ABS braking is impending, or else ABS braking has already been performed.

The fact that a specific event is impending can be understood to mean that a calculation result or an extrapolation of available data indicates that the occurrence of the mentioned event is probable within a short period of time in the future. The period of time here can be 0.5 seconds, 1 second or 2 seconds, for example.

It can be provided that the information system is configured to be used in a transportation vehicle that has a Brake-by-Wire system. As already described further above, in transportation vehicles with such a brake system, information actively output by the transportation vehicle about a driving situation or some other state of the transportation vehicle can be beneficial, since in the case of such a decoupling, the user receives less direct feedback from the transportation vehicle, in particular, less audible and haptic feedback about a driving state of the transportation vehicle and a reaction of the transportation vehicle to the surface and/or the operation of the transportation vehicle by the user. Since it is particularly beneficial for such a transportation vehicle to provide the driver with indications, such as additionally output information, at the same time the risk increases that the driver feels distracted by the information provided. In a case such as this, it is particularly useful to offer the driver with the possibility of adapting the frequency and the scope of the output of information to their personal preferences.

It is possible for the driving parameter to be slip control of driven and/or braked wheels. Such a configuration is beneficial, in particular, with the Brake-by-Wire brake system already previously discussed.

According to at least one disclosed embodiments, the control parameter predefined by the user includes a selection of a driving profile or a setting of an electronic stability program. In general, the selection of a driving profile and the setting of an electronic stability program can be combined under the term "selection of a driving program". When selecting such a driving program, the output or suppression of the information can be made dependent, for example, on the selected driving profile (e.g., "normal", "comfort", "sport", "race") or the setting of the electronic stability program (ESC setting), for example, thus "ESC normal" or "ESC sport". It is possible for each driving profile and/or each ESC setting to be assigned a characteristic for the suppression of the output of the information. In the simplest case, this characteristic can be binary, therefore 0 or 1, for example. Then, depending on the setting linked to the respective driving program, either all information awaiting output which then corresponds to a characteristic of 1 is output, or all information awaiting output which then corresponds to a characteristic of 0 is suppressed.

Alternatively, the characteristic can be a parameter employed in the process of making the decision as to whether the output of information is performed or suppressed. Thus, for example, each driving profile can be assigned a numerical value that is incorporated as a factor in the decision-making process. Therefore, for example, a driving profile setting "comfort" could be assigned a value of 1, a driving profile setting "normal" could be assigned a value of 0.75, a driving profile setting "sport" could be assigned a value of 0.5 and a driving profile setting "race" could be assigned a value of 0.25. These values can then be incorporated, for example, into a product of this characteristic and a parameter that influences a level of the engagement in the driving parameter, a size of a detected hazard or some other parameter that influences the output or suppression of the information.

For the result of the calculation, for example, for the described product, a limit value can then be predefined, below which the output of the information is suppressed and above which the information is output. It is conceivable that different limit values are stored and/or settable for different assistance system-related information for making the decision as to whether the information is to be output or suppressed.

As already indicated, it can be provided that a user can deactivate the output of specific information independently of the activation of the associated assistance system. This can be implemented, for example, by a specifically selectable item in a menu navigation of the transportation vehicle, for example, in the "individual" menu.

It is possible for the control parameter predefined by the user to determine a limit value for an engagement characteristic that describes a level of the engagement in the driving parameter, wherein the output of the information to the user is suppressed if the engagement characteristic is below the limit value. The transportation vehicle or a control unit of the transportation vehicle first determines whether the output of information is a possibility and then, if the output of information is a possibility, determines a level of the engagement in the driving parameter. The level of the engagement in the driving parameter can be measured, for example, by the magnitude of an applied steering force, by the magnitude of a steering correction angle, by the magnitude of an engagement in the longitudinal guidance of the transportation vehicle, for example, thus by the magnitude of a triggered acceleration or deceleration or similar parameters. In other words, it can therefore be provided that information that relates to a relatively high level of engagement in a driving parameter is output, whereas information relating to a lower level of engagement in a driving parameter is suppressed. A limit value for the level of the driving parameter can be permanently predefined and stored. Alternatively, such a limit value may be settable as a function of other parameters, for example, of the control parameter predefined by the user, or explicitly settable by the user.

It is possible for the control parameter predefined by the user to include a setting as to whether information about an existing or impending engagement of the transportation vehicle in a driving parameter is to be output. In other words, it can be provided that the output of the information about the impending or existing engagement in a driving parameter can be switched on and off separately from the associated assistance system. Traditionally, the individual assistance systems can be deactivated, which makes it possible for a user who feels distracted by the output of information to avoid a perceived distraction such as this. However, since at the same time the associated assistance system is also deactivated, the possibility of being able to separately activate or deactivate the output of the information is beneficial, because in this way the assistance system can remain active and can therefore increase driving safety.

It is furthermore possible for the control parameter predefined by the user to determine whether a result of an evaluation of a driving situation is incorporated into the decision as to whether the output of the information to the user is suppressed. The evaluation of the driving situation can include here, in particular, an evaluation of a level of danger of a driving situation and/or an evaluation of a significance of the information to the user, for example, to permit an engagement or a change in behavior of the user.

The evaluation of the driving situation can include, in particular, an evaluation of a driving state, the presence of an autonomous or manual driving mode, detected poor coefficients of friction between the wheels of the transportation vehicle and the surface, in other words therefore a risk of skidding, for example, or other surroundings-related data. A risk of skidding can be caused by a wet or frozen roadway, damage to the roadway, certain wind conditions or other causes such as oil or other greasy coatings on the roadway, for example. The transportation vehicle can obtain information about such surroundings-related data via onboard sensors or else via an information system, for example, a Car2Car or Car2x communication, or via some other communication interface, for example, with a cloud storage device. Position data and/or surroundings-related data determined from the position data can also be used. For example, the transportation vehicle can thus detect whether it is "off-road" from normal streets or on a racetrack, for example.

It is possible for the control parameter predefined by the user to be a degree of autonomy of driving. Therefore, it can be provided, for example, that during autonomous driving, during autonomous and partially autonomous driving or starting from a specific degree of autonomy of driving, the output of the information or of the pieces of information is suppressed.

It is also possible, as already indicated previously, that surroundings-related data determined or received by the transportation vehicle are taken into account in the decision as to whether the output of the information to the user is suppressed. The taking into account of such surroundings-related data can, as already described previously, be implemented via an evaluation of the driving situation or else by a risk assessment independently of the specific driving situation. Thus, for example, when a black-ice hazard or some other risk factors is/are detected, a threshold for the suppression of the output of the information can be raised, so that information that would have been suppressed in the absence of such a hazard or such a risk factor is also output.

This is further achieved by a method for the situational suppression of an output of information about an existing or impending engagement of a transportation vehicle in a driving parameter for driving the transportation vehicle, comprising:

a. determining whether an engagement of the transportation vehicle in a driving parameter is existing or impending,
b. if an engagement of the transportation vehicle in a driving parameter is existing or impending, determining a relevance value for the existing or impending engagement,
c. consulting at least one control parameter predefined by the user,
d. determining, by the relevance value and the control parameter, whether the information about the existing or impending engagement of the transportation vehicle in the driving parameter is output or suppressed.

A relevance value here can be understood to mean a significance of the information that is to be output or suppressed. Parameters such as a driving speed, the previously discussed surroundings-related data, detected obstacles or other transportation vehicles or the like can be incorporated here into the determination of the relevance value. In very general terms, different assistance systems can be assigned different base relevance values. The relevance value can be a measure for a detected level of danger of a current driving situation.

Lastly, this is achieved by a transportation vehicle having an information system of the previously described type and/or having a control unit designed to perform the previously described method. Such a transportation vehicle then has all the previously outlined benefits of the disclosed information system.

FIG. 1 shows a schematic side view of a transportation vehicle 2 equipped with a first exemplary embodiment of an information system 12. The transportation vehicle 2 is moving on a surface 4 and is in contact therewith via the wheels 6. A user, in particular, a driver of the transportation vehicle 2, can sit on a seat 8. The user can interact with the transportation vehicle 2 via a range of operating elements, of which, for the sake of simplicity, only a few are depicted, and via various output methods or mechanisms of the transportation vehicle 2.

The information system 12 has a control unit 14 that is capable of executing computer programs, receiving data from a plurality of data sources, processing these data and outputting information via various channels. The control unit can obtain information here via sensors arranged on the wheels 6, further sensors 16 such as cameras, radar sensors or temperature sensors, for example, or via the communication device 18 that can produce, in particular, a wireless connection to a network or to other transportation vehicles. As already explained, this information can relate to information about slip conditions at the wheels 6 or about the use of an anti-lock braking system. The information can also include environmental conditions and/or the surroundings of the transportation vehicle 2 and here, in particular, properties of the surface 4, detected obstacles or detected other vehicles, or information about a route.

The user can perform adjustments on the information system 12 via an input element, for example, via a display 20 equipped with a touch function. In particular, they can therefore set or influence a control parameter that is then in turn taken into account by the information system 12 in the process of making the decision as to whether information is to be displayed or suppressed.

If information is to be output, it can be output in various ways. For example, the seat 8 and/or the brake pedal 10 can be set in vibrations at different intensity, or information can be output on the display 20 and/or on the dashboard 26, which for this purpose can also have a display or else special lighting elements, for example. Furthermore, the information can be output audibly, for example, via the speaker 30. It is also possible to use the light 36 that can be part of the ambient lighting of the motor vehicle 2, for the output of information.

Figure 2:
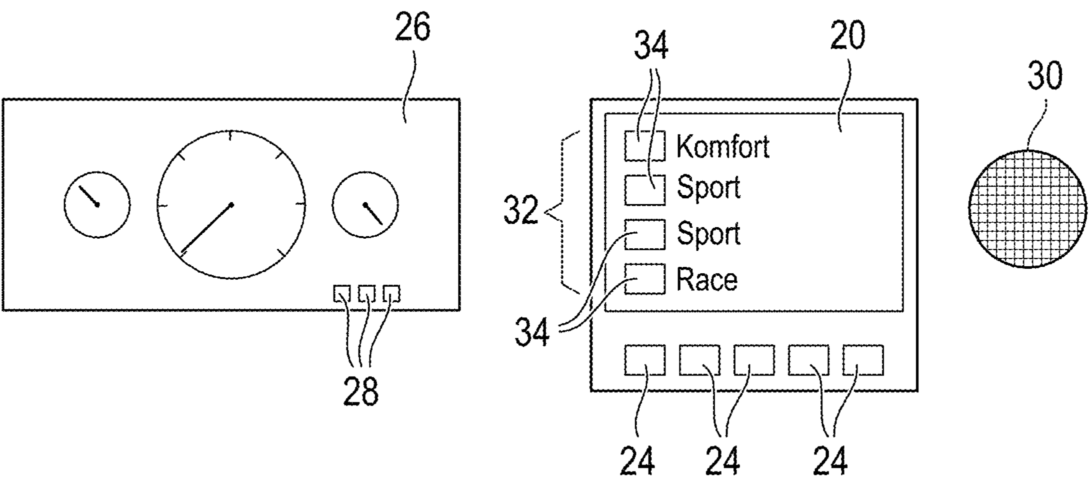
FIG. 2 schematically shows a schematic view of a dashboard or center console of a transportation vehicle with a second exemplary embodiment of an information system.

FIG. 2 shows a schematic view of a dashboard or center console of a transportation vehicle equipped with a second exemplary embodiment of a disclosed information system. In the left-hand area of the figure, the dashboard 26 is depicted, which has a plurality of visual indicators 28 in the bottom-right area. Depending on which information is to be output, one or more of these visual indicators 28 can be illuminated. In the right-hand area of the figure, a display 20 is depicted which can also be used to output information. Furthermore, the display 20 can generally be used for the communication of the user with the transportation vehicle. Therefore, the display 20 can interact with a plurality of operating elements 24, which can be configured as buttons or knobs. It is also possible for the display 20 to be configured as a touchscreen. In the depicted view, the display 20 shows a menu 32 with individual menu items 34. In the depicted view, the menu 32 offers the user various options for selecting a driving program. The user can then select the options by touching the display 20 or optionally also via assigned operating elements 24.

In the right-hand area of the figure, the speaker 30 can also be seen, which can also be used to output information. For further communication with the user, a microphone, not depicted in the figure, may also be present, via which the user can perform voice inputs.

Figure 3:
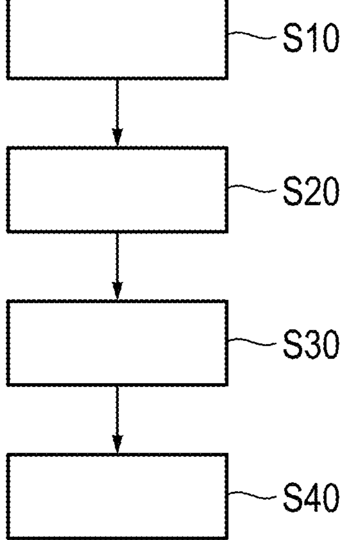
FIG. 3 schematically shows a flow diagram to explain a first exemplary embodiment of a disclosed method.

FIG. 3 shows a flow diagram to explain a first exemplary embodiment of a disclosed method. In an operation at S10, it is determined whether an engagement of the transportation vehicle in a driving parameter is existing or impending. In an operation at S20, if an engagement of the transportation vehicle in a driving parameter is existing or impending, a relevance value for the existing or impending engagement is determined. In an operation at S30, at least one control parameter predefined by a user is consulted. In an operation at S40, finally it is determined, by the relevance value and the control parameter or the plurality of control parameters, whether the information about the existing or impending engagement of the transportation vehicle in the driving parameter is output or suppressed. In an operation that is not depicted in more detail, the information can then optionally be output.

Figure 4:
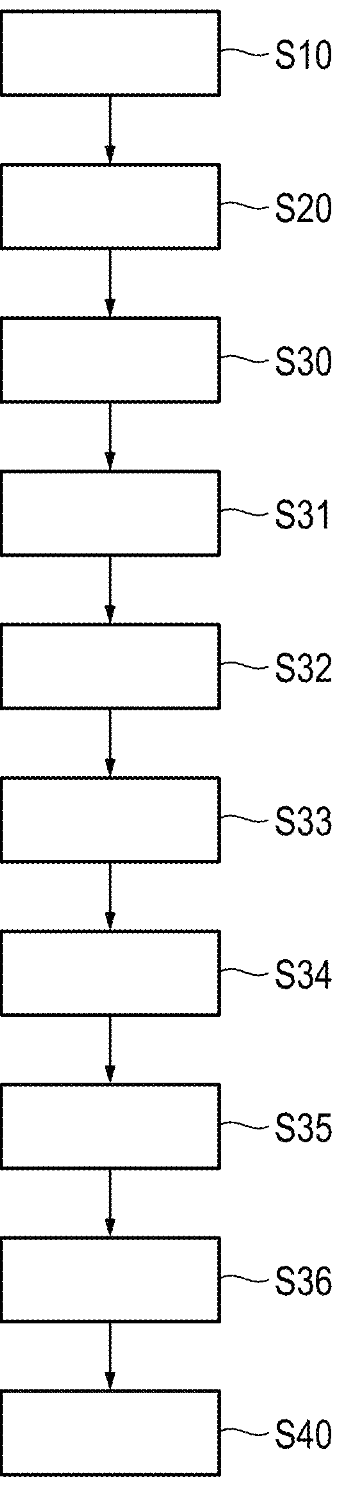
FIG. 4 schematically shows a flow diagram to explain a second exemplary embodiment of a disclosed method.

FIG. 4 shows a flow diagram to explain a second exemplary embodiment of a disclosed method. The operations at S10, S20, S30 and S40 here are identical to the operations in the first exemplary embodiment described previously with reference to FIG. 3. The operations at S31, S32, S33, S34, S35 and S36 are each optional and can be performed in any desired combinations.

In operation at S31, a preset driving profile is requested and any control parameter associated therewith is read out.

In operation at S32, a setting of an electronic stability program (ESC) is requested and any control parameter associated therewith is read out.

In operation at S33, a limit value for an engagement characteristic that describes a level of the engagement in the driving parameter is read out. Also in this operation, the information system can analyze the engagement in the driving parameter and can thus determine the associated engagement characteristic.

In operation at S34, a setting is read out as to whether the output of information relating to an engagement in a driving parameter is essentially deactivated or essentially activated. The setting of such a control parameter by the user can optionally overwrite all further method operations.

In operation at S35, a setting is read out as to whether a result of an evaluation of a driving situation is incorporated into the decision as to whether the output of the information to the user is suppressed. Furthermore, in this operation a driving situation can be optionally analyzed and evaluated, wherein the information system can draw on various information sources such as sensor data and network information for this purpose.

In operation at S36, a setting can be read out as to whether surroundings-related data determined or received by the transportation vehicle are taken into account in the decision as to whether the output of the information to the user is suppressed. Furthermore, surroundings-related data can be optionally determined and evaluated in this operation.

In principle, the disclosed method can be performed for a plurality of different engagements in different driving parameters one after the other or in parallel.

Figure 5:
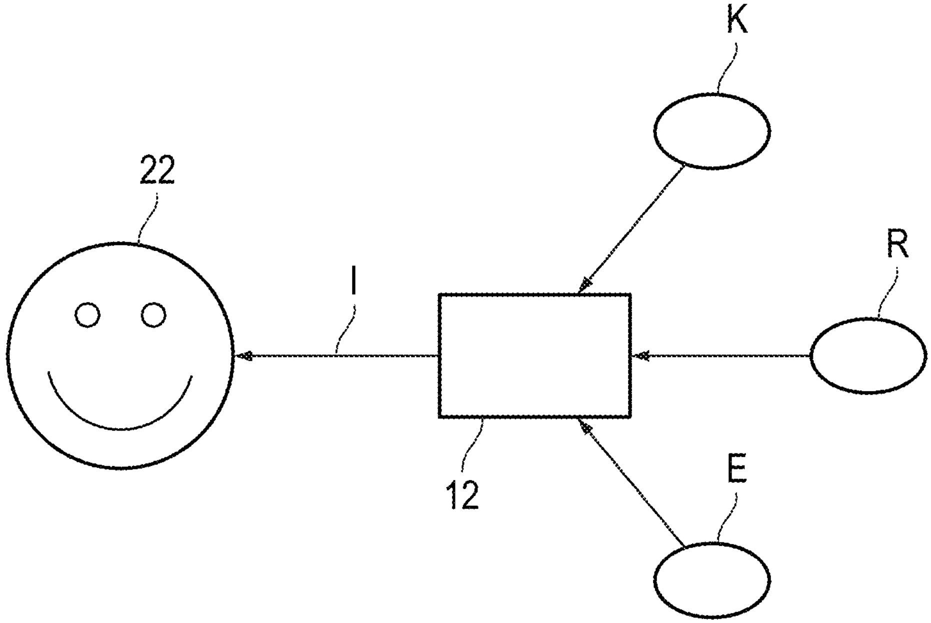
FIG. 5 schematically shows a mode of operation of a third exemplary embodiment of a disclosed information system.

FIG. 5 schematically shows a mode of operation of a third exemplary embodiment of a disclosed information system 12. The information system 12 determines, optionally continuously, whether an engagement E of the transportation vehicle in a driving parameter is existing or impending. If this is the case, the information system 12 reads out, from a storage device, for example, a control parameter K and decides, using the control parameter K, whether the information I is output to the user 22, or whether the output of the information I is suppressed. Optionally, a relevance value R for the existing or impending engagement can be determined. This relevance value R can then also be taken into account in the decision by the information system 12 as to whether the information I is output or suppressed.

LIST OF REFERENCE SIGNS

2 transportation vehicle
4 surface
6 wheel
8 seat
10 brake pedal
12 information system
14 control unit
16 sensors
18 communication device
20 display
22 user
24 operating element
26 dashboard
28 visual display
30 speaker
32 menu
34 menu items
36 light
K control parameter
E engagement
I information
R relevance value

The invention claimed is:

1. An information system for a transportation vehicle,
wherein the information system is configured to output, during a journey of the transportation vehicle, information to a user of the transportation vehicle about an existing or impending engagement of the transportation vehicle in a driving parameter,
wherein situational suppression of the output of information to the user about the existing or impending engagement of a transportation vehicle in the driving parameter for driving the transportation vehicle is performed based on a value of a control parameter predefined by the user and a relevance value for the existing or impending engagement.

2. The information system of claim 1, wherein the driving parameter is slip control of driven and/or braked wheels.

3. The information system of claim 1, wherein the control parameter predefined by the user includes a selection of a driving profile or a setting of an electronic stability program.

4. The information system of claim 1, wherein the control parameter predefined by the user sets a limit for an engagement characteristic that describes a level of the engagement in the driving parameter, wherein the output of the information to the user is suppressed in response to the engagement characteristic being below the limit.

5. The information system of claim 1, wherein the control parameter predefined by the user includes a setting that determines whether information about an existing or impending engagement of the transportation vehicle in a driving parameter is to be output.

6. The information system of claim 1, wherein the control parameter predefined by the user is used to determine whether a result of an evaluation of a driving situation is incorporated into the decision to determine whether the output of the information to the user is suppressed.

7. The information system of claim 1, wherein the control parameter predefined by the user is a degree of autonomy of driving of the transportation vehicle.

8. The information system of claim 1, wherein the output of the information to the user is suppressed based also on surroundings-related data determined or received by the transportation vehicle.

9. A transportation vehicle comprising the information system of claim 1.

10. A method for the situational suppression of an output of information to a user about an existing or impending engagement of a transportation vehicle in a driving parameter for driving the transportation vehicle, the method comprising:

determining whether an engagement of the transportation vehicle in a driving parameter is existing or impending;

determining a relevance value for the existing or impending engagement in response to an engagement of the transportation vehicle in an existing or impending driving parameter;

consulting at least one control parameter predefined by the user; and determining whether the information about the existing or impending engagement of the transportation vehicle in the driving parameter is to be output or suppressed based on the relevance value and the control parameter.

11. The method of claim 10, wherein the driving parameter is slip control of driven and/or braked wheels.

12. The method of claim 10, wherein the control parameter predefined by the user includes a selection of a driving profile or a setting of an electronic stability program.

13. The method of claim 10, wherein the control parameter predefined by the user sets a limit for an engagement characteristic that describes a level of the engagement in the driving parameter, wherein the output of the information to the user is suppressed in response to the engagement characteristic being below the limit.

14. The method of claim 10, wherein the control parameter predefined by the user includes a setting that determines whether information about an existing or impending engagement of the transportation vehicle in a driving parameter is to be output.

15. The method of claim 10, wherein the control parameter predefined by the user is used to determine whether a result of an evaluation of a driving situation is incorporated into the decision to determine whether the output of the information to the user is suppressed.

16. The method of claim 10, wherein the control parameter predefined by the user is a degree of autonomy of driving of the transportation vehicle.

17. The method of claim 10, wherein the output of the information to the user is suppressed based also on surroundings-related data determined or received by the transportation vehicle.

* * * * *